US012704159B2

(12) United States Patent
Huster et al.

(10) Patent No.: US 12,704,159 B2
(45) Date of Patent: Aug. 11, 2026

(54) CALIPER BODY, PIN AND ELASTIC ELEMENT ASSEMBLY; BRAKE CALIPER; PIN ASSEMBLY; CALIPER BODY; AND ASSEMBLY METHOD FOR A PAD SUPPORTING PIN INTO A CALIPER BODY OF A VEHICLE

(71) Applicant: BREMBO S.p.A., Curno (IT)

(72) Inventors: Michael Huster, Curno (IT); Cristian Crippa, Curno (IT); Davide D'Alessio, Curno (IT); Alessandro Finazzi, Curno (IT)

(73) Assignee: Brembo S.p.A., Curno (IT)

( * ) Notice: Subject to any disclaimer, the term of this patent is extended or adjusted under 35 U.S.C. 154(b) by 425 days.

(21) Appl. No.: 18/252,744

(22) PCT Filed: Nov. 9, 2021

(86) PCT No.: PCT/IB2021/060351
§ 371 (c)(1),
(2) Date: May 12, 2023

(87) PCT Pub. No.: WO2022/101772
PCT Pub. Date: May 19, 2022

(65) Prior Publication Data

US 2024/0003391 A1 Jan. 4, 2024

(30) Foreign Application Priority Data

Nov. 13, 2020 (IT) ........................ 102020000027233

(51) Int. Cl.
*F16D 55/2265* (2006.01)
*F16D 55/00* (2006.01)

(52) U.S. Cl.
CPC .. *F16D 55/22655* (2013.01); *F16D 2055/002* (2013.01); *F16D 2055/0041* (2013.01); *F16D 2055/007* (2013.01)

(58) Field of Classification Search
CPC ............ F16D 55/22655; F16D 55/227; F16D 2055/007
See application file for complete search history.

(56) References Cited

U.S. PATENT DOCUMENTS 3,450,234 A * 6/1969 Koji ...................... F16D 65/095 188/73.31
3,980,160 A * 9/1976 Hoffmann ............ F16D 55/228 188/73.38

(Continued)

FOREIGN PATENT DOCUMENTS

| | | | |
|---|---|---|---|
| DE | 2742964 | A1 | 3/1978 |
| DE | 102017208575 | A1 | 11/2017 |
| EP | 1425520 | A1 | 6/2004 |

OTHER PUBLICATIONS

European Patent Office, International Search Report, issued in PCT/IB2021/060351, Feb. 18, 2022, Rijswijk, NL.

*Primary Examiner* — Thomas W Irvin
(74) *Attorney, Agent, or Firm* — Marshall & Melhorn, LLC

(57) ABSTRACT

A caliper body, pin and an elastic element assembly having a caliper body, a brake pad supporting pin, and an elastic element is provided. The elastic element is fitted on the brake pad supporting pin. The brake pad supporting pin has portions that can be accommodated in a caliper body first housing and in a caliper body second housing made in the caliper body without interfering in an axial direction with surfaces of the caliper body having an extension in a radial direction. The elastic element is accommodated in a first housing first portion of the caliper body first housing. The (Continued)

elastic element abuts against a first housing abutment portion to define a limit stop of the brake pad supporting pin in the caliper body.

18 Claims, 10 Drawing Sheets

(56) References Cited

U.S. PATENT DOCUMENTS

| | | | | |
|---|---|---|---|---|
| 4,084,665 | A * | 4/1978 | Burnett ............. F16D 55/22655 | 188/73.45 |
| 4,265,340 | A * | 5/1981 | Scott ..................... F16D 55/227 | 188/73.44 |
| 4,279,331 | A * | 7/1981 | Lupertz ................. F16D 55/227 | 188/71.8 |
| 4,678,210 | A * | 7/1987 | Balsells .................. F16B 21/18 | 285/306 |
| 5,259,484 | A | 11/1993 | Idesawa et al. | |
| 6,039,156 | A * | 3/2000 | Schneider ......... F16D 55/22655 | 188/73.44 |
| 2004/0188191 | A1* | 9/2004 | Lintner .................... F16J 3/048 | 188/73.45 |
| 2019/0353213 | A1 | 11/2019 | Inoue et al. | |
| 2023/0407932 | A1* | 12/2023 | Carminati ............. F16D 55/228 | |

* cited by examiner 29
35
34
Dp4
40
41
Dp1
43
42
Dp3
36
37
31
39
32
38

29
Dp4
34
35
40
41
Dp1
43
42
R2
Dp3
36
37
31
39
32
38

1
46

46
1

CALIPER BODY, PIN AND ELASTIC ELEMENT ASSEMBLY; BRAKE CALIPER; PIN ASSEMBLY; CALIPER BODY; AND ASSEMBLY METHOD FOR A PAD SUPPORTING PIN INTO A CALIPER BODY OF A VEHICLE

FIELD OF THE INVENTION

The present invention relates to a caliper body, pin and elastic element assembly, to a brake caliper, to a pin assembly, to a caliper body, and to an assembly method for a pad supporting pin into a caliper body of a vehicle.

BACKGROUND ART

In a disc brake of known type, the brake caliper is generally arranged to straddle a brake disc mounted on the hub of a vehicle wheel. The brake caliper usually comprises a caliper body which accommodates the brake pads and actuators to push the pads against the disc to achieve the braking action on the vehicle.

In some known disc brake types, the pads are supported by supporting pins accommodated in appropriate caliper body housings made in the caliper body, wherein each supporting pin crosses through corresponding holes made in the backing plate for the friction material of each brake pad. Such supporting pins have a longitudinal extension axis, a pin head, and a pin tip arranged on opposite ends of the extension axis.

The supporting pins are coupled with clearance relative to the respective caliper body housing and consequently elastic elements are used to axially constrain the pins to the caliper body housings.

In some cases, such elastic elements are coaxially pre-assembled to the pin body in a pin annular housing. The pin annular housing, in which the elastic element is accommodated, provides an axially extending, usually cylindrical, bottom wall, axially delimited by at least a housing first wall substantially transverse to the bottom wall minus flared machining connectors.

Such elastic elements are usually expanding elastic elements and have a larger radial dimension than the radial dimension of the housing first wall in a resting condition. In this manner, when the supporting pin provided with the expanding elastic element is assembled to the caliper body, the expanding elastic element is radially compressed by the walls of the caliper body housing in the direction of the supporting pin, and the expanding elastic element is constrained by friction to the caliper body housing. As a result, the expanding elastic element provides an axial constraint aimed at preventing the pin from falling out of its housing.

The expanding elastic element is inserted by sliding inside the caliper body housing, e.g., under a thrust action. Once the expanding elastic element is positioned inside the caliper body housing, and at least a pin abutment portion of the supporting pin is axially abutting against the caliper body defining the maximum insertion position of the pin in the caliper body, the elastic element forms an axial constraint relative to the pin thereby preventing the movements of the pin in the extraction direction until the action in the axial direction applied by the housing first wall of the pin housing exceeds the static friction force between the elastic element and the caliper body, allowing the sliding of the elastic element relative to the caliper body and, consequently, allowing the pin to exit from its housing.

For example, document EP1425520 by the applicant, shows a brake pad supporting pin coupled to a barrel-shaped expanding elastic element.

The shape of the supporting pins and the respective expanding elastic elements is such to satisfy the need to guarantee an easy assembly of a brake caliper assembly, as well as a simple replacement of the brake pads, e.g., during maintenance, and at the same time to satisfy the need to guarantee an axially constrained coupling between the supporting pins and the caliper body during vehicle use, withstanding the operating biases.

In a further aspect, to guarantee the correct axial positioning of the supporting pin and elastic element assembly, the pad supporting pins of known type are worked to have a pin abutment portion which when the supporting pin has reached its maximum axial insertion position axially abuts against the caliper body, and the elastic expansion element forming a radial seal with the caliper body prevents the unwanted release of the supporting pin from the caliper body.

The pad supporting pins are worked in different manners to obtain different pin abutment portions according to the type of caliper body on which they must be mounted, e.g., on monobloc caliper bodies or on caliper bodies having two caliper half-bodies assembled together. Consistently, the caliper body housings in which the pin tip and pin head are housed, respectively, have different shapes according to the type of caliper body.

Some types of pad supporting pins have a pin abutment portion, i.e., a shoulder, at the pin tip end having a larger radial dimension than a smaller diameter pin tip end portion, so that it comes into contact with the caliper body when the pin is inserted into the caliper body reaching its maximum axial insertion position.

In other types of pad supporting pins, the pin portion in which the annular housing is obtained, in which the elastic element is arranged, has a larger radial dimension than the rest of the pin and thus has, in the direction of the pin tip, a pin fitting shoulder shaped to abut against a caliper body housing shoulder so that it abuts against the caliper body when the pin is inserted into the caliper body reaching its maximum axial insertion position. In such a case, the caliper body housings in which the pin portion in which the annular housing is obtained is accommodated usually comprises a first cylindrical portion and a second cylindrical portion having different diameters that are connected by the shoulder of the caliper body housing.

Although such pad supporting pins and the corresponding elastic elements meet the requirements of obtaining simple assembly and easy maintenance, it has been found that the mechanical operations to define the pin abutment portions make the manufacturing of the supporting pins particularly complex and has a significant impact on the final cost and processing time.

Therefore, the need is strongly felt in the sector to make pad supporting pins which are easy to manufacture and which make it possible to reduce the production costs per piece, and at the same time make it possible to standardize the geometry of the pins for different types of calipers, thus further facilitating the assembly processes of such assemblies into respective caliper bodies.

Therefore, the problem underlying the present invention is to provide a caliper body, pin and elastic element assembly, as well as a brake caliper, a pin assembly, a caliper body and assembly method for a pad supporting pin into a caliper body of a vehicle, which have structural and functional features to satisfy the aforesaid requirements and, at the same time, solve the drawbacks mentioned with reference to the prior art and satisfy the aforesaid felt needs.

Solution

It is the object of the present invention to provide a caliper body, pin and elastic element assembly, as well as a brake caliper, a pin assembly, a caliper body and an assembly method for a pad supporting pin in a caliper body of a vehicle, which are easy to manufacture and at the same time allow easy maintenance and assembly.

This and other objects and advantages are achieved by a caliper body, pin and elastic element assembly, a brake caliper, a pin assembly, a caliper body and an assembly method for a brake pad supporting pin in a caliper body of a vehicle as described and claimed herein.

Some advantageous embodiments are also described.

The analysis of this solution shows that the suggested solution makes it possible to obtain a simplification of the machining of the supporting pins, maintaining an easy correct positioning of the supporting pin and the respective elastic element inside the caliper body.

Furthermore, the suggested solution reduces manufacturing costs by reducing the pin portions which must be machined after drawing.

Furthermore, the suggested solutions make it possible to standardize the different types of pins and the different types of pin housings made in the caliper body, further reducing manufacturing costs and simplifying the assembly operations.

FIGURES

Further features and advantages of the caliper body, pin and elastic element assembly, brake caliper, pin assembly, caliper body, and assembly method, are given by way of non-limiting examples, with reference to the accompanying figures, in which:

FIGS. 1B and 10 are partial section views taken along the plane of section A of FIG. 1A of an insertion sequence of a brake pad supporting pin provided with an elastic element of the known type into a monobloc caliper body, in which a pin abutment portion 46 that axially abuts against the caliper body is visible;

Figure 1A:
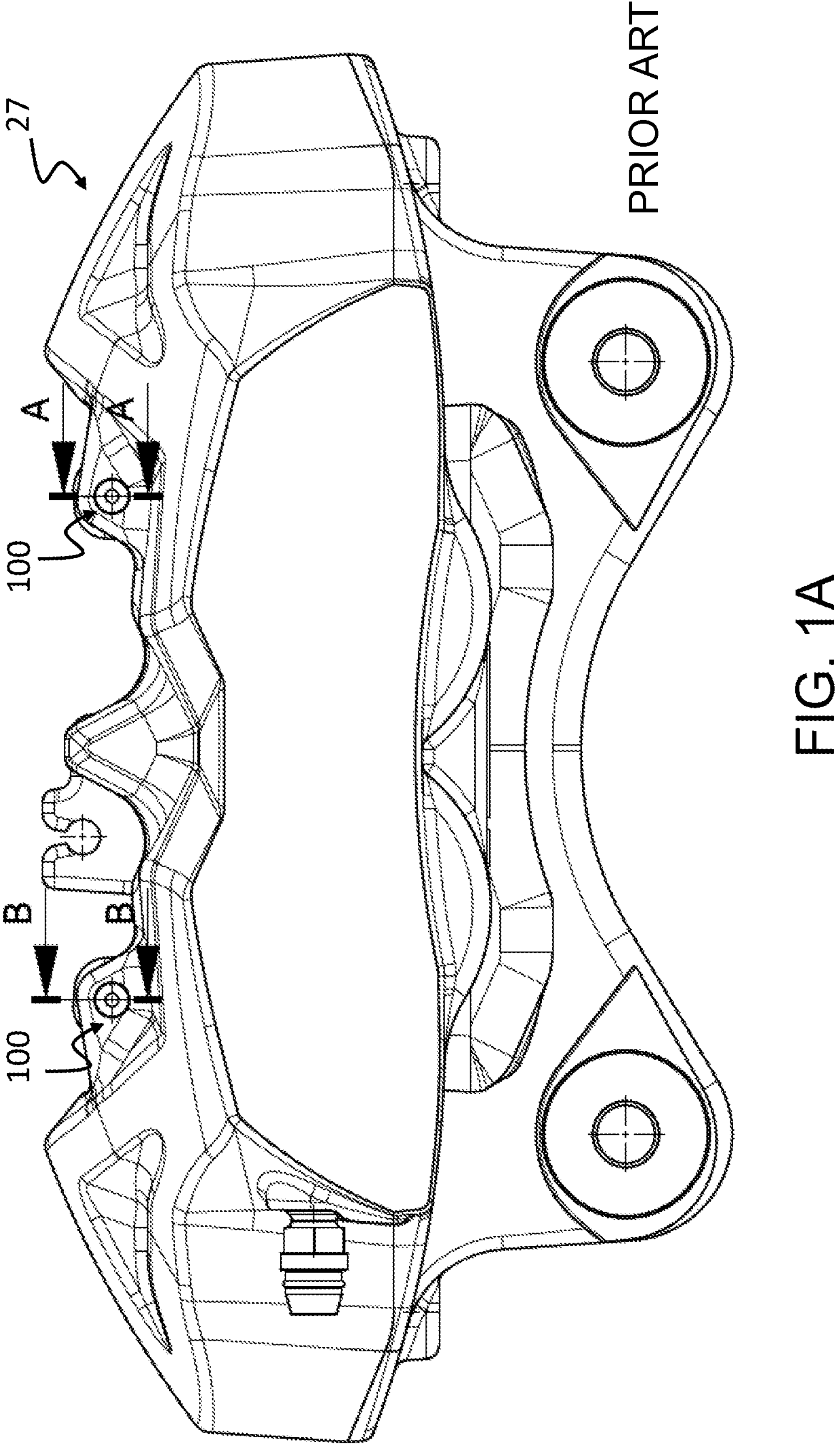
FIG. 1A shows a side view of a known type monobloc brake caliper.
Figure 1C:
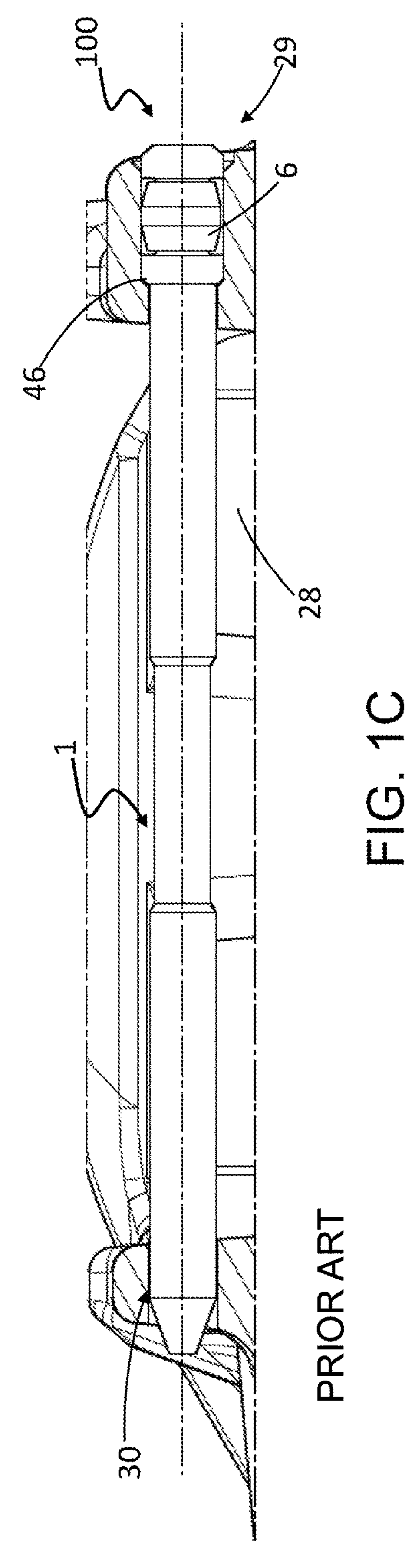
Figure 1B:
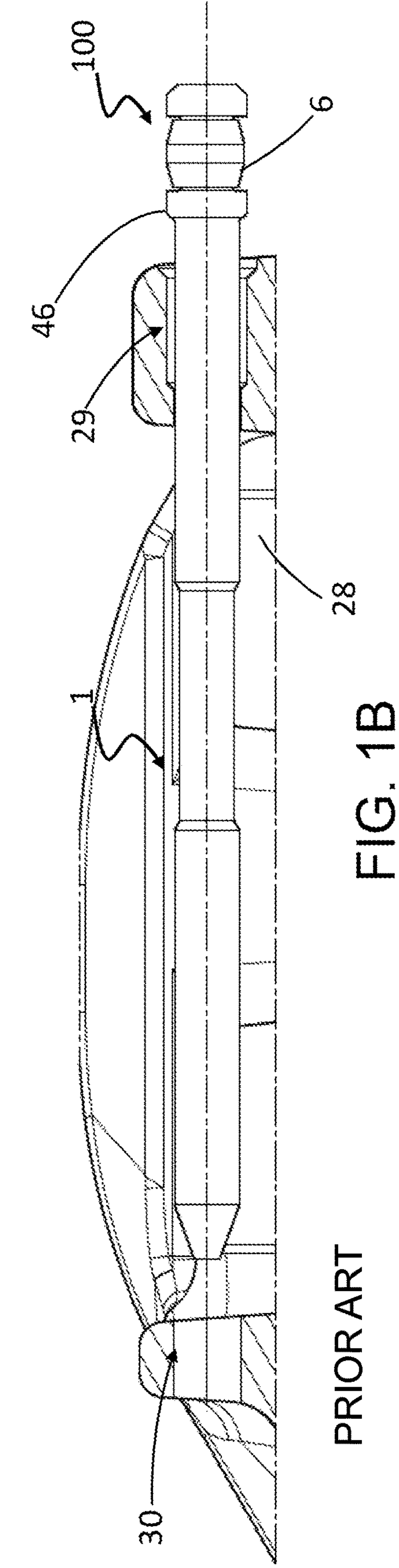
Figure 2A:
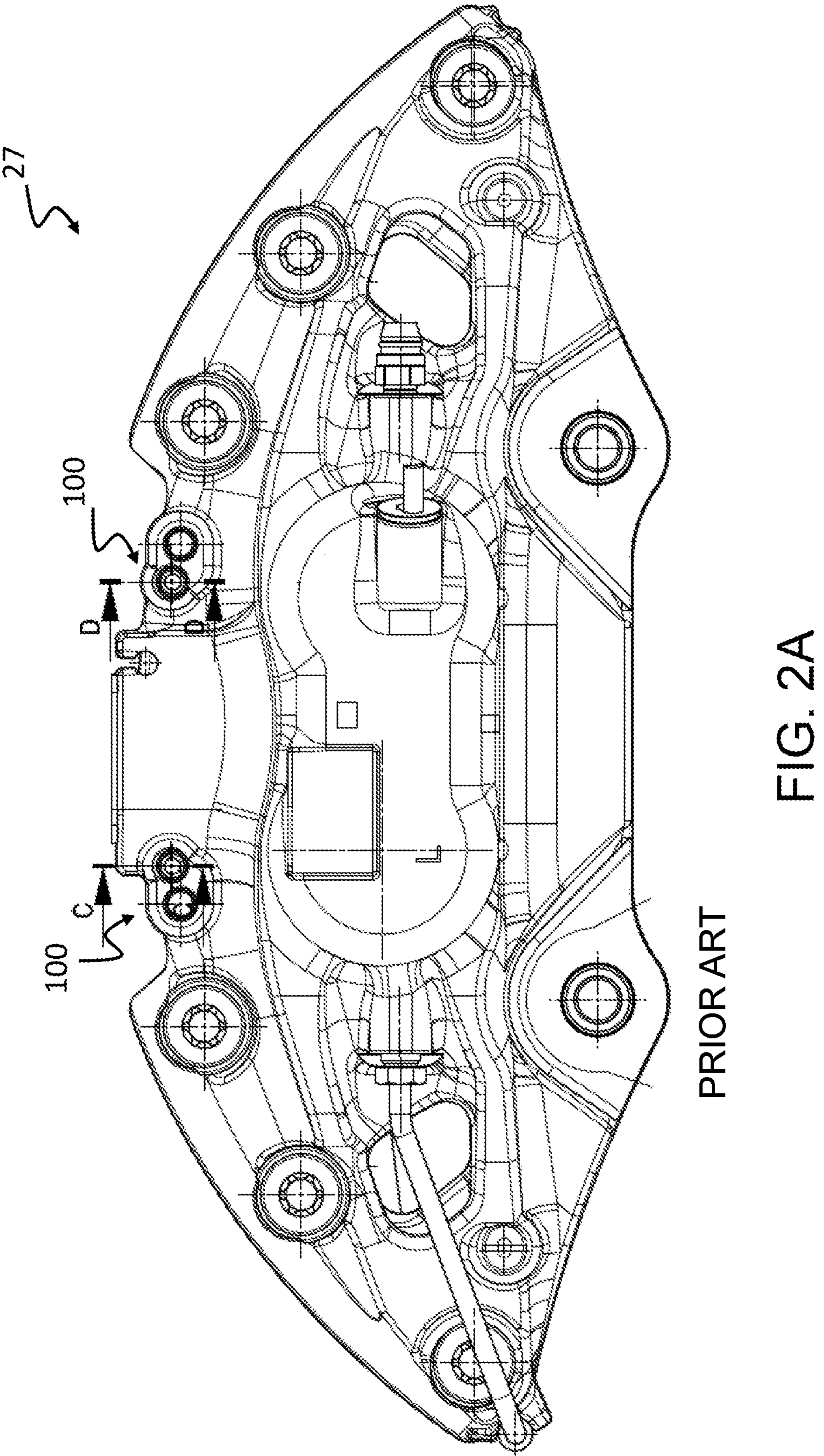
FIG. 2A shows a side view of a known type of brake caliper in which the caliper body comprises two half-bodies.
Figures 2B, 2C:
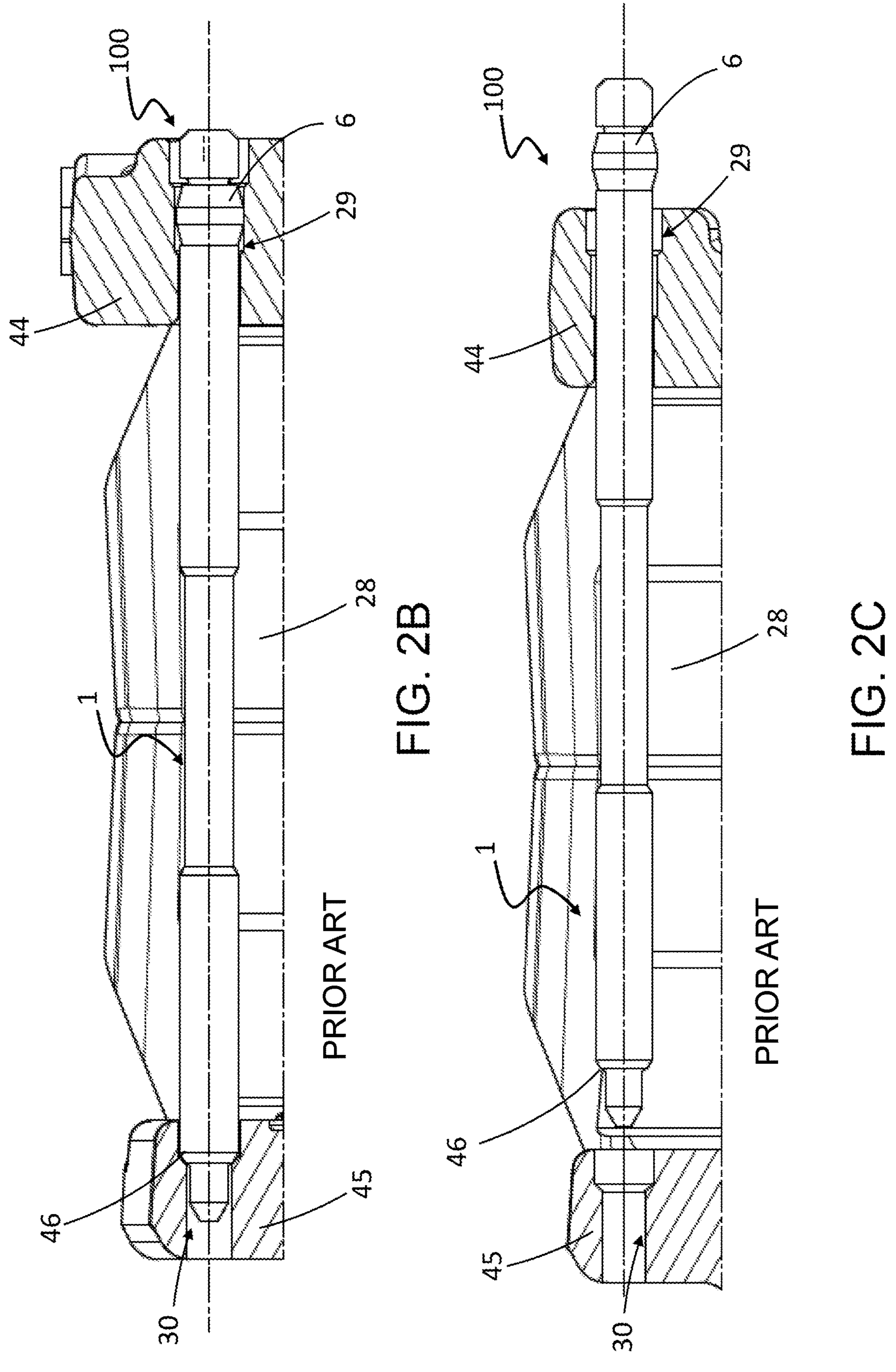
FIGS. 2B and 2C are partial section views taken along the plane of section D of FIG. 2A of an insertion sequence of a brake pad supporting pin provided with an elastic element of the known type into a caliper body having two half-bodies, in which a pin abutment portion stop 46 that axially abuts against the caliper body is visible.
Figure 3:
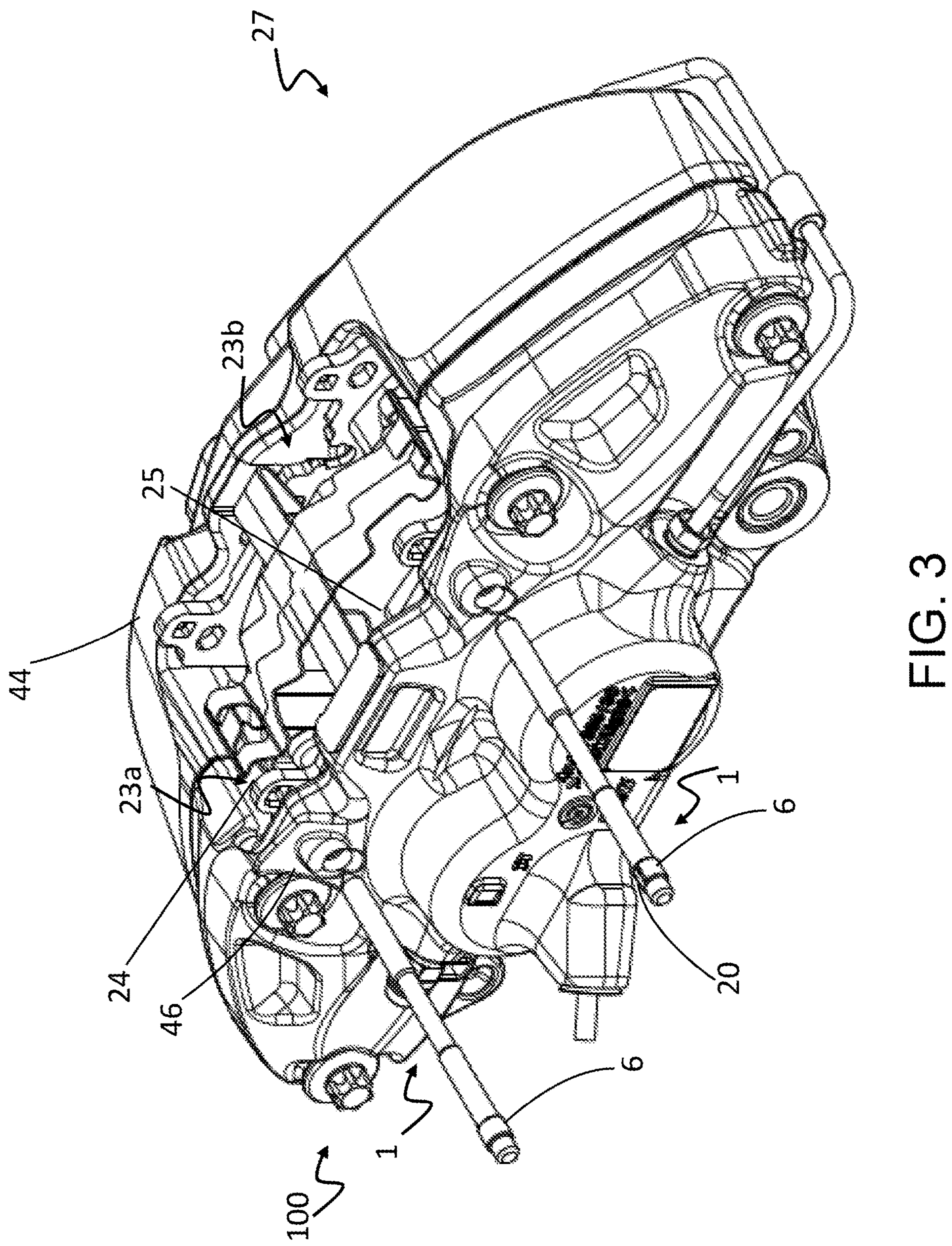
FIG. 3 shows in a perspective view of a caliper body, supporting pin and elastic element assembly according to the present invention, in which the caliper body may be monobloc or made in two pieces.
Figures 4A, 4B, 4C:
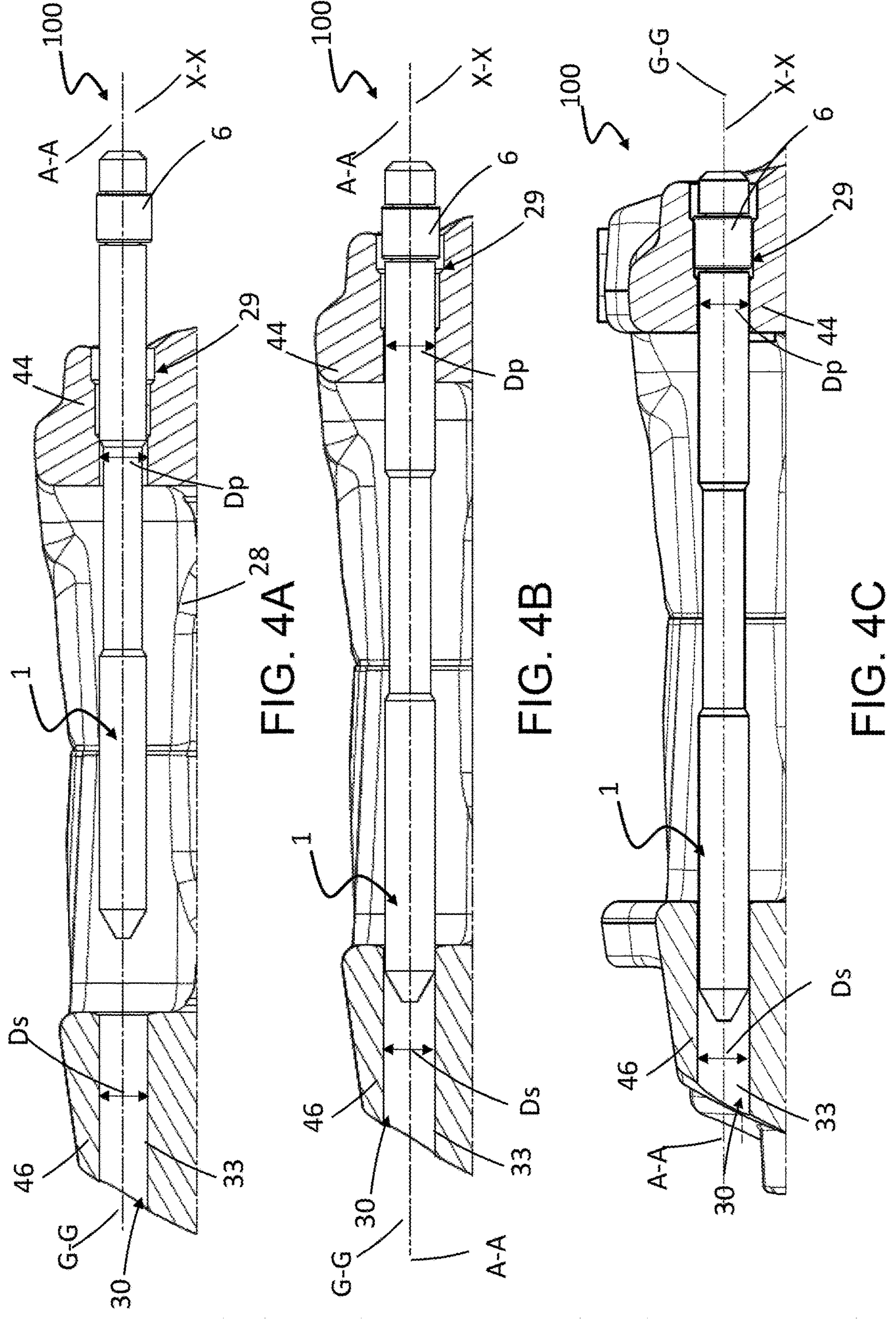
FIGS. 4A-4C are partial section views of the caliper body of FIG. 3 of an insertion sequence of a pad supporting pin into a caliper body according to the present invention.
Figures 5A, 5B:
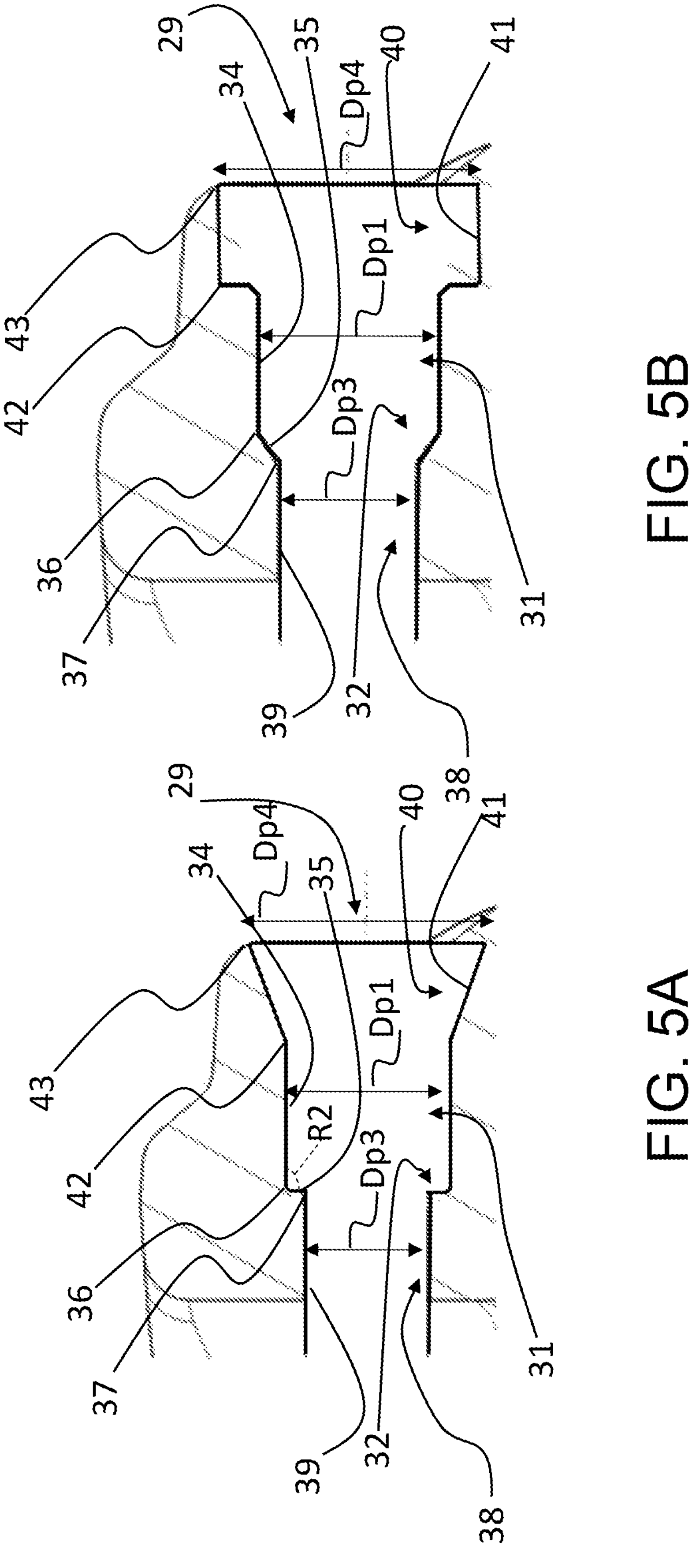
FIGS. 5A-5B are partial section views of the first housing made in the caliper body in FIGS. 4A-4C in two different configurations.
Figures 6A, 6B:
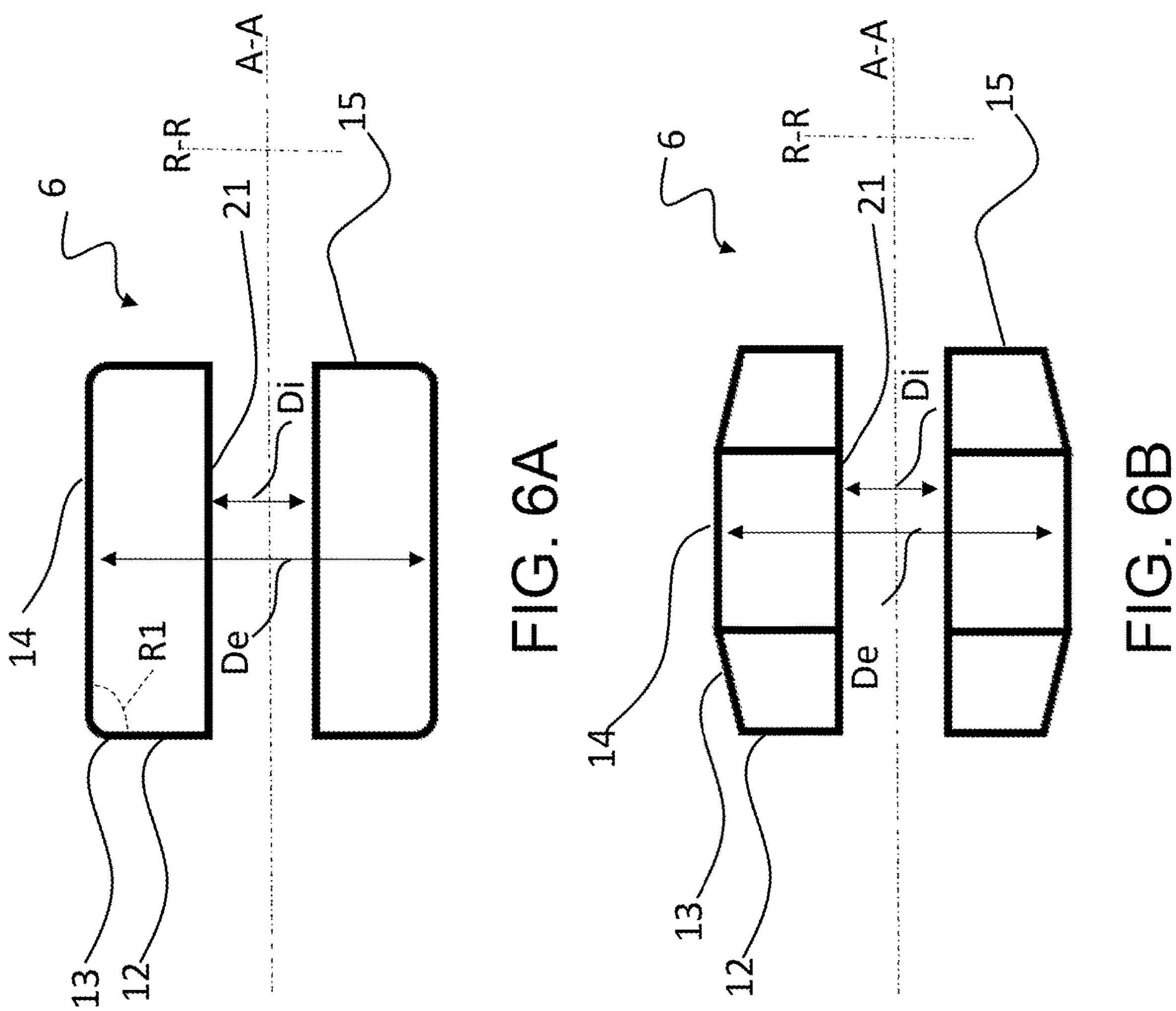
Figures 7A, 7B:
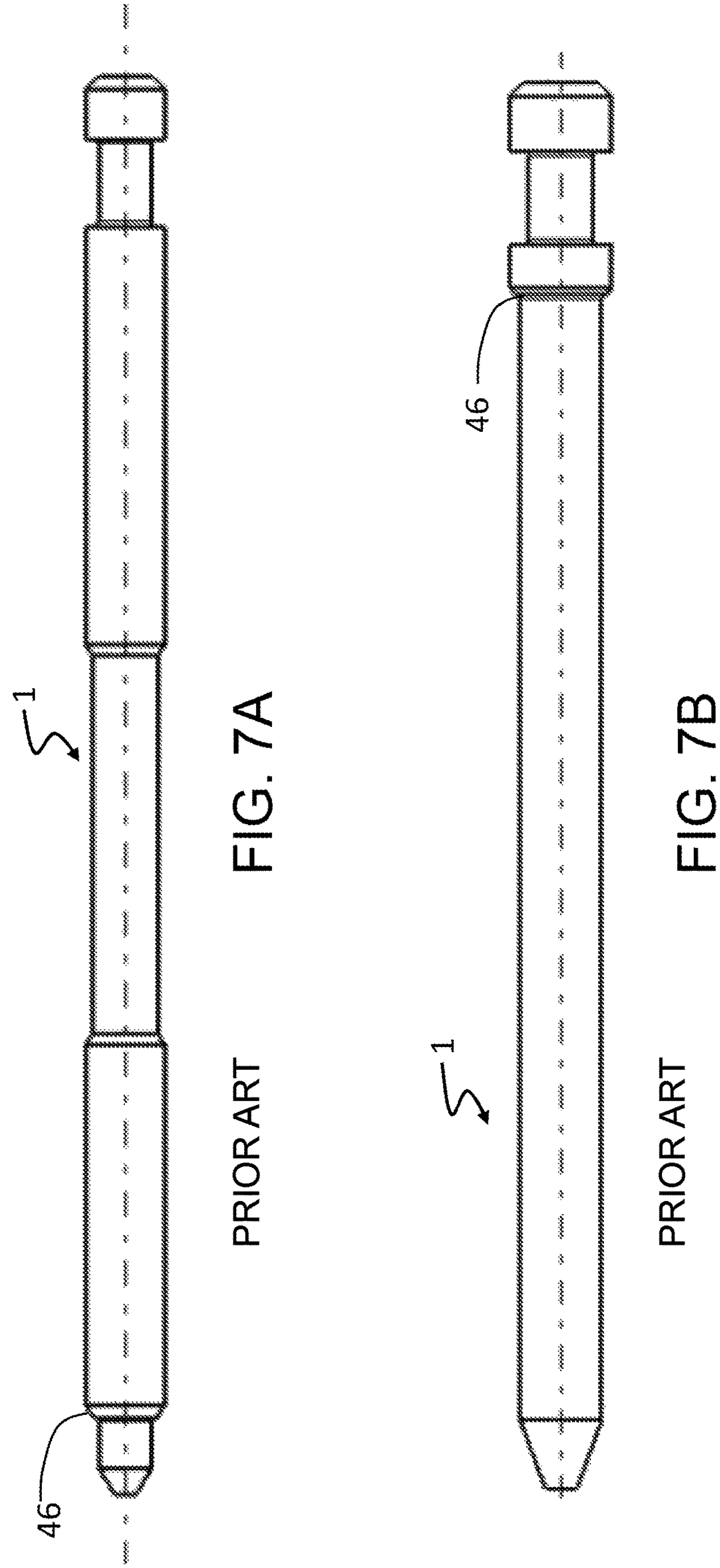
Figures 8A, 8B:
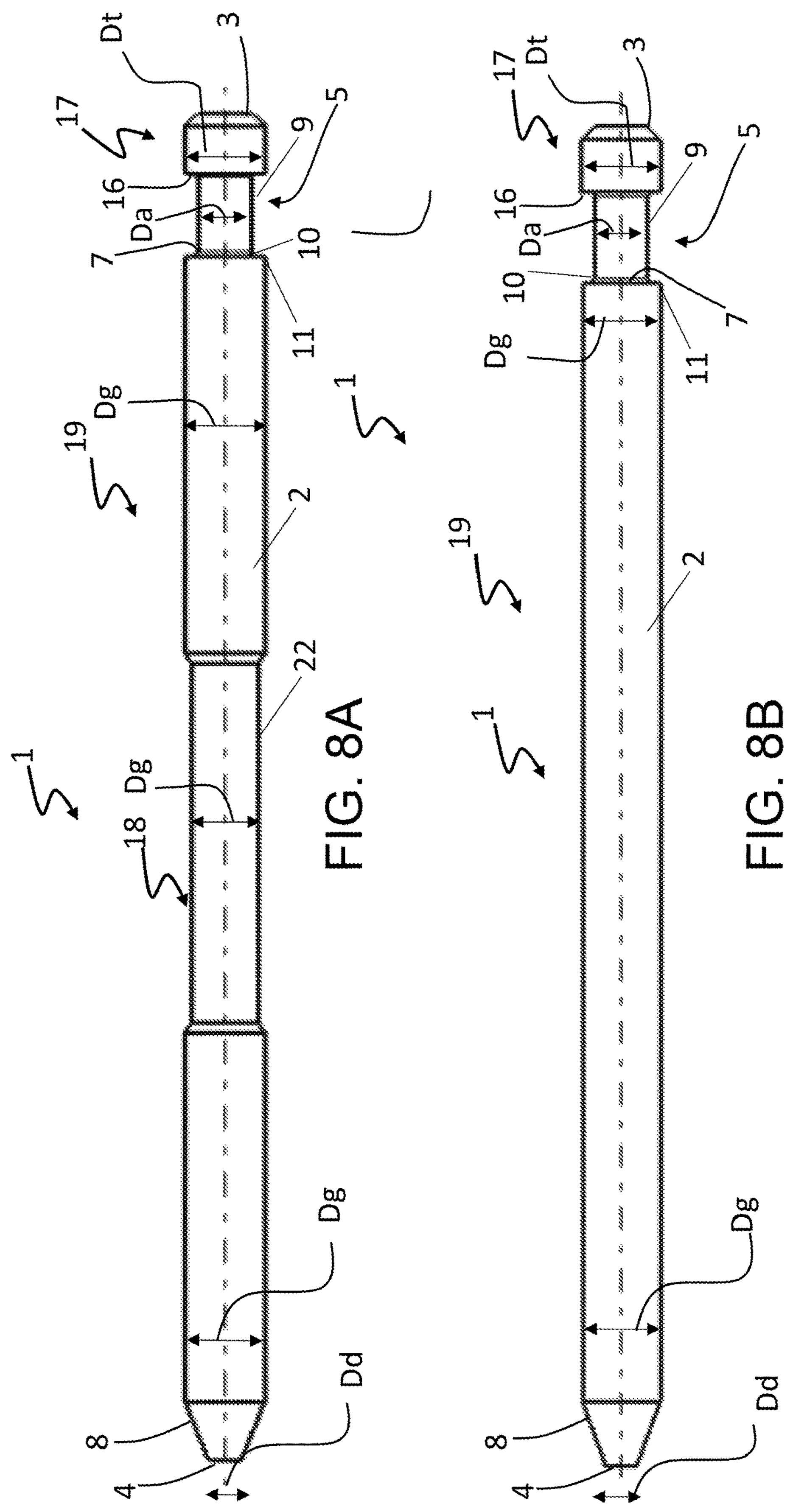

FIGS. 6A and 6B respectively show a cross-section view of a cylindrical tubular elastic element according to the present invention and a barrel-shaped elastic element according to the present invention configured to be fitted on pad pins according to the present invention;

FIGS. 7A and 7B respectively are side views of a pad supporting pin of the known type for two-piece calipers and a pad supporting pin of the known type for monobloc calipers, in which the pin body portions, shoulders, made to axially abut against respective portions of the caliper body are visible;

FIGS. 8A and 8B respectively show side views of a pad supporting pin for two-piece calipers according to the present invention and a pad supporting pin for monobloc calipers according to the present invention, in which the pin body of said pins is worked to prevent the pin body portions from axially abutting against the respective portions of the caliper body.

DESCRIPTION OF SOME PREFERRED EMBODIMENTS

According to a general embodiment, a caliper body, pin and elastic element assembly (100) is indicated by reference numeral 100 as a whole.

Said assembly 100 comprises a caliper body 28 of a brake caliper 27, brake pad supporting pin 1, and an elastic element 6.

Said caliper body 28 comprises a first elongated element 44 and a second elongated element 45. Said first elongated element 44 comprises at least a caliper body first housing 29, which may be understood to mean a first through-hole 29, and said second elongated element 45 comprises at least a caliper body second housing 30, which may be understood to mean a second through-hole 30.

According to an embodiment, each said first elongated element 44 and said second elongated element 45 are made in one piece.

According to an embodiment, said first elongated element 44 and said second elongated element 45 are two separate pieces.

Said caliper body first housing 29 and said caliper body second housing 30 each have axis housing G-G.

Said caliper body first housing 29 has a caliper body first housing diameter $D_p$, which may be understood to mean a first through-hole diameter $D_p$, and wherein said caliper body second housing 30 has a caliper body second housing diameter $D_s$, which may be understood to mean a second through-hole diameter $D_s$.

Said caliper body first housing 29 and said caliper body second housing 30 comprise respective prevalent axial or longitudinal housing extensions or housing lengths along said housing axis G-G.

Said caliper body first housing 29 comprises in succession at least a first housing first portion 31, a first housing abutment portion 32, and a first housing third portion 38.

Said brake pad supporting pin 1 comprises a pin body 2 which extends along a pin axis X-X between a pin proximal end 3 and a pin distal end 4. Said pin axis X-X defines an axial direction A-A, either coincident with or parallel to said pin axis X-X, and a radial direction R-R transverse to said axial direction A-A. Said pin X-X is parallel and coincident with each housing axis G-G.

Said pin 2 is adapted to fit into said caliper body first housing 29 and said caliper body second housing 30.

According to an embodiment, said pin body 2 is cylindrical.

Said pin body 2 comprises in succession at least an elastic element pin annular housing 5, which may be understood to be a pin annular groove 5, and a pin shank 19. Said pin shank 19 has a pin shank diameter Dg, and said pin annular housing 5 has a pin annular housing diameter Da.

According to an embodiment, said pin body 2 comprises a pin head 17. Said pin head comprises a prevailing longitudinal or axial extension or length along said pin axis X-X.

Said pin annular housing 4 and said pin shank 19 comprise respective prevailing longitudinal or axial pin body extensions or pin body lengths along said pin axis X-X.

The elastic element 6 is fitted on the pin body 2 and arranged in the pin annular housing 5. The elastic element 6 comprises an elastic element outer diameter De. The elastic element 6 can be accommodated in the first housing first portion 31 and is adapted to abut against the first housing abutment portion 32.

According to an embodiment, said elastic element 6 comprises at least an inner diameter Di.

Said elastic element 6 comprises an elastic element prevailing longitudinal or axial extension or elastic element length along said axial direction A-A.

Within this description, the diameter of an element means the values that the diameter of said element may assume in a cross-section at the axial direction A-A along the longitudinal or axial length or extent of said element.

Said pin shank diameter Dg measured in any cross-section relative to said pin axis X-X of said pin shank 19 along its longitudinal extension is either smaller than or equal to said caliper body first housing diameter Dp measured in any cross-section relative to said housing axis G-G of said first housing third portion 38 along its longitudinal extension.

Said pin shank diameter Dg measured in any cross-section relative to said pin axis X-X of said pin shank 19 along its longitudinal extension is either smaller than or equal to said caliper body second housing diameter Ds measured in any cross-section relative to said housing axis G-G of said caliper body second housing 30 along its longitudinal extension.

According to an embodiment, the pin annular housing diameter Da measured in any cross-section relative to the pin axis X-X of the pin annular housing 5 along its longitudinal extension is either smaller than or equal to the caliper body first housing diameter Dp measured in any cross-section relative to the housing axis G-G of the caliper body first housing 29 along its longitudinal extension.

According to an embodiment, said elastic element inner diameter Di measured in any cross-section of said pin axis X-X of said elastic element 6 along its longitudinal extension is either greater than or equal to said pin annular housing diameter Da measured in any cross-section relative to said pin axis X-X of said pin annular housing 5 along its longitudinal extension.

Said elastic element outer diameter De measured in at least a cross-section relative to said pin axis X-X of said elastic element 6 along its extension is greater than said shank diameter Dg measured in any cross-section relative to said pin axis X-X of pin shank 19 along its longitudinal extension.

The elastic element outer diameter De measured in at least a cross-section relative to the pin axis X-X of the elastic element 6 along its longitudinal extension is equal to said caliper body first housing diameter Dp measured in at least a cross-section relative to the housing axis G-G of said first housing first portion 31 along its longitudinal extension.

The elastic element outer diameter De measured in at least a cross-section area at the pin axis X-X of the elastic element 6 along its longitudinal extent is greater than the first housing diameter Dp measured in at least a cross-section area at the housing axis G-G of the first housing abutment portion 32 along its longitudinal extension so that the elastic element 6 axially abuts with the first housing abutment portion 32 defining a limit stop of the supporting pin 1 in the caliper body 28.

By virtue of the suggested solution, at least said pin annular housing 5 and said pin shank 19 have dimensions such that they can be accommodated respectively in said caliper body first housing 29, and in said first housing third portion 38 and said caliper body second housing 30, without interfering in axial direction A-A with surfaces having extension in radial direction R-R of said caliper body 28.

By virtue of the suggested solution, said elastic element 6 has dimensions such as to form said axial abutment with said first housing abutment portion 32 to define said limit stop of the pin 1 in said caliper body 2 preventing the pin body 2 from going into axial abutment with the caliper body 2, i.e., with surfaces having extension in radial direction R-R of said caliper body 28.

By virtue of the suggested solutions, said pin body 2 is shaped to prevent the pin body 2 from axially abutting against the caliper body 2. In other words, the pin body 2 is free of pin body abutment portions which could hinder insertion of the pin 1 into the caliper body 28.

By virtue of the suggested solutions, the caliper body housings 29, 30 of said caliper body 28 are shaped to allow sliding of the pin body 2 without axial abutments and to allow said limit stop of the pin 1 in the caliper body 2 by virtue of the provision of a first housing abutment portion 32 adapted to axially interfere with said elastic element 6.

According to an embodiment, the elastic element inner diameter Di measured in any cross-section relative to the pin axis X-X of the elastic element 6 along its longitudinal extension is smaller than the pin shank diameter Dg measured in at any cross-section relative to the pin axis X-X of said pin shank 19 along its longitudinal extension.

According to an embodiment, said pin head 17 has a pin head diameter Dt.

According to an embodiment, said elastic element inner diameter Di measured in any cross-section of said pin axis X-X of said elastic element 6 along its longitudinal extension is smaller than said pin head diameter Dt measured in any cross-section relative to said pin axis X-X of said pin head 17 along its longitudinal extension.

According to an embodiment, said the pin head diameter Dt is smaller than the caliper body first housing diameter Dp measured in each cross-section area at said housing axis G-G of the first housing first portion 31 and of the first housing abutment portion 32.

According to an embodiment, said elastic element 6 has such dimensions as to form a radial seal with said first housing first portion 31 to apply a friction force which opposes a force to remove the pin 1 from the caliper body 28.

According to an embodiment, said elastic element 6 comprises an elastic element radially outer axial wall 14 adapted to form said radial seal with said first housing first portion 31 of said caliper body first housing 29.

According to an embodiment, said pin shank 19 comprises at least a pin first shoulder 7 which axially delimits said annular housing 5 in the direction of said pin distal end 4.

According to an embodiment, said pin head 17 comprises a second pin shoulder 16 which axially delimits said annular housing 5 in the direction of said proximal pin end 3.

According to an embodiment, said first pin shoulder 7 extends in a radial direction R-R between a first shoulder radially inner edge 10 and a first shoulder radially outer edge 11.

According to an embodiment, said elastic element 6 comprises at least an elastic element first wall 12 and an elastic element second wall 13.

According to an embodiment, said elastic element 6 comprises an elastic element third wall 15 adapted to face to said pin second shoulder 16.

According to a first embodiment, said elastic element first wall 12 is adapted to abut against said pin first shoulder 7.

According to an embodiment, said elastic element second wall 13 is adapted to form said axial abutment with said first housing abutment portion 32 of said first housing 29.

According to a second embodiment, said elastic element second wall 13 is radially outer relative to said first shoulder radially outer edge 11 both when said pin 1 is inserted in the housings 29, 30 of the caliper body and when said pin 1 is outside the caliper body 28.

According to an embodiment, said elastic element first wall 12 is radially inner relative to said first shoulder radially outer edge 11 both when said pin 1 is inserted in the housings 29, 30 of the caliper body 28 and when said pin 1 is outside the caliper body 28.

According to an embodiment, said elastic element 6 comprises an elastic element body which is elastically reversible between a resting configuration and a compression configuration.

According to an embodiment, in the resting configuration, the elastic element outer diameter De measured in at least a cross-section of the axial direction A-A of the elastic element 6 along its longitudinal extension is greater than the first housing diameter Dp measured in at least a cross-section of the axial direction A-A of the first housing first portion 31 along its longitudinal extension. In the compression configuration, the elastic element outer diameter De measured in at least a cross-section relative to the axial direction A-A of the elastic element 6 along its longitudinal extension is equal to the first housing diameter Dp measured in at least a cross-section relative to the axial direction A-A of a first housing first portion 31 along its longitudinal extension.

According to an embodiment, said elastic element 6 comprises at least an elastic element radially inner axial wall 21. Said radially inner axial wall 21 being adapted to face the outer surface of said pin body 2 at said pin annular housing 5.

According to an embodiment, said elastic element 6 has an elastic element through opening 20 which allows said elastic element 6 to pass from said resting configuration to said compressed configuration or to an extended configuration to fit said elastic element 6 to the pin body 2 in a simplified manner.

According to an embodiment, said elastic element through opening 20 extends in a radial direction R-R, between said elastic element radially outer axial wall 14 and an elastic element radially inner axial wall 21, and in an axial direction A-A, between said elastic element first wall 12 and said elastic element second wall 13, and said elastic element third wall 15.

According to an embodiment, said elastic element second wall 13 extends seamlessly at least in a radial direction R-R from said elastic element first wall 12.

According to an embodiment, said elastic element second wall 13 is connected to said elastic element radially outer axial wall 14 with a first connection radius R1.

According to an embodiment, said elastic element first wall 12 is substantially a circular crown which extends in a radial direction R-R facing said first pin shoulder 7.

According to an embodiment, said elastic element second wall 13 is substantially a circular crown.

According to an embodiment, said elastic element first wall 12 and said elastic element second wall 13 are coplanar and orthogonal to said pin axis X-X.

According to an embodiment, said elastic element radially outer axial wall 14 is a cylindrical wall. According to an embodiment, said elastic element radially inner axial wall 21 is a cylindrical wall.

According to an embodiment, said elastic element third wall 15 extends seamlessly at least in radial direction R-R between said elastic element radially outer axial wall 14 and said elastic element radially inner axial wall 21.

According to an embodiment, said the elastic element third wall 15 is a circular crown having extension exclusively in the radial direction R-R.

According to an embodiment, said elastic element first wall 12 and said elastic element third wall 15 are perpendicular to said axial direction A-A and are spaced along said axial direction A-A of said elastic element axial extension.

According to an embodiment, said elastic element 6 is annular and has an elastic element through opening 20.

According to an embodiment, the elastic element 6 is barrel-shaped.

According to an embodiment, said elastic element 6 is cylindrical-tubular-shaped.

According to an embodiment, the cylindrical-tubular-shaped elastic element 6 makes it possible to achieve a stable abutment between the circular-crown-shaped elastic element second wall 13 and the first housing abutment portion 32. In this manner, unlike the prior art, the elastic element 6 is free of truncated portions, or blunt portions, which can be wedged within a portion of the caliper body first housing 29 consequently tightening the elastic element 6 and reducing the radial seal and holding force of the pin.

According to an embodiment, said first housing 29 and said second housing 30 are through housings.

According to an embodiment, said caliper body 28 comprises a second housing wall 33 which defines said caliper body second housing 30.

According to an embodiment, said second housing wall 33 is cylindrical, wherein said second housing diameter Ds is constant throughout the axial extension of the second housing 30.

According to an embodiment, the caliper body 28 comprises a first housing first wall 34 which defines the first housing first portion 31.

According to an embodiment, said first housing first wall 34 is a cylindrical wall and a first housing first portion diameter Dp1 which is constant throughout the axial extension of the first housing first portion 31.

According to an embodiment, said caliper body 28 comprises a first housing second wall 35 which defines said first housing abutment portion 32.

According to an embodiment, the first housing second wall 35 extends in at least in a radial direction R-R between a first housing second wall radially outer edge 36 and a first housing second wall radially inner edge 37.

According to an embodiment, said caliper body first housing 29 comprises a first housing third portion 38.

According to an embodiment, said caliper body 28 comprises a first housing third wall 39 which defines said first housing third portion 38.

According to an embodiment, said first housing third wall 39 is cylindrical and first housing third portion diameter Dp3.

According to an embodiment, said first housing third portion diameter Dp3 is equal to said second housing diameter Ds.

According to an embodiment, said first housing second wall radially inner edge 37 has a diameter equal to said first housing third portion diameter Dp3.

According to an embodiment, said first housing second wall is connected to said first housing first wall 34 with a second connection radius R2.

According to an embodiment, said first housing second wall radially outer edge 36 has a diameter equal to said first housing first portion diameter Dp1, and wherein said first housing second wall radially inner edge 37 has a diameter smaller than said first housing first portion diameter Dp1.

According to an embodiment, said first housing second wall 35 is a circular crown which defines a first housing shoulder.

According to an embodiment, said first housing second wall 35 is a conical crown which defines a first housing inner chamfer.

According to an embodiment, said caliper body first housing 29 comprises a first housing fourth portion 40.

According to an embodiment, said caliper body 28 comprises a first housing fourth wall 41 which defines said first housing fourth portion 40.

According to an embodiment, said first housing fourth wall 41 extends in at least an axial direction A-A between a first housing fourth wall first edge 42 and a first housing fourth wall second edge 43.

According to an embodiment, said first housing fourth wall second edge 43 defines an insertion port for inserting said pin 1 into said caliper body 28.

According to an embodiment, said first housing fourth wall first edge 42 has a diameter equal to said first housing first portion diameter Dp1.

According to an embodiment, said first housing fourth wall radially inner edge 43 has a greater diameter than said first housing first portion diameter Dp1.

According to an embodiment, said first housing fourth wall 41 also extends in radial direction R-R and is a conical crown which defines a first housing outer chamfer which facilitates insertion of said pin 1 into said first housing 29.

According to an embodiment, said first housing fourth wall 41 is cylindrical and has a first housing fourth portion constant diameter Dp4 which is greater than said first housing first portion diameter Dp1.

According to an embodiment, the first connection radius R1 of the elastic element 6 is not smaller than the second connection radius R2 of the caliper body first housing 29.

According to an embodiment, said pin distal end 4 has a pin distal end diameter Dd and said pin shank 19 comprises a shank tapered portion 8 and a shank constant diameter portion, wherein the shank constant diameter portion has a diameter greater than a pin distal end diameter Dd.

According to an embodiment, the shank tapered portion 8 extends along the axial direction A-A towards the pin distal end 4 seamlessly reducing the pin shank diameter Dg from the value of the shank constant diameter portion diameter to the pin distal end diameter Dd to facilitate insertion of the pin 1 in the housings 29, 30 preventing the pin body 2 from abutting against the portions of the caliper body 28. In other words, the pin shank 19 has a cylindrical shape with a constant diameter first stretch and a truncated shape second stretch corresponding to the shank tapered portion 8.

According to an embodiment, said pin body 2 comprises a reduced diameter pin portion 9 which defines said annular housing 5 for accommodating said elastic element 6.

According to an embodiment, said pin shank 19 comprises a central pin portion 18 which has a central portion cut-away 22 for accommodating a brake caliper spring.

The present invention further relates to a brake caliper 27. Said brake caliper 27 comprises a caliper body, supporting pin and elastic element assembly 100 as described above and at least a brake pad 23*a*, 23*b*.

According to an embodiment, each brake pad 23*a*, 23*b* has a backing plate 24 connected to a friction material 25, wherein each backing plate 24 comprises at least a plate through hole 26 for accommodating said brake pad supporting pin 2.

According to an embodiment, said brake caliper 27 is a monobloc caliper.

According to an embodiment, said caliper body 28 comprises two caliper half-bodies.

The present invention further relates to a disc brake assembly for a vehicle, comprising a brake disc connected to a hub of a wheel of the vehicle, and a brake caliper 27 as previously described, in which the caliper body 28 is arranged to straddle the brake disc. The present invention further relates to a pin assembly comprising a pad supporting pin 1 and an elastic element 6 adapted to cooperate with a caliper body 28 comprising a first elongated element 44 and a second elongated element 45. The first elongated element 44 comprises at least a caliper body first housing 29 and said second elongated element 45 comprises at least a caliper body second housing 30, wherein said caliper body first housing 29 and said caliper body second housing 30 each have a housing axis G-G, wherein said caliper body first housing 29 comprises in succession at least a first housing first portion 31, a first housing abutment portion 32 and a first housing third portion 38, said caliper body first housing 29 having a prevailing longitudinal extension and having a caliper body first housing diameter Dp, and said caliper body second housing 30 having a prevalently longitudinal extension and having a caliper body second housing diameter Ds. The supporting pin 1 comprises a pin body 2 which extends along a pin axis X-X between a pin proximal end 3 and a pin distal end 4, wherein said pin axis X-X defines an axial direction A-A, either coincident with or parallel to said pin axis X-X, and a radial direction R-R transverse to said axial direction A-A, wherein said pin body 2 is adapted to fit into said caliper body first housing 29 and said caliper body second housing 30, wherein said pin X-X is parallel and coincident with each housing axis G-G. The pin body 2 comprises in succession at least a pin annular housing 5 for an elastic element and a pin shank 19 of a prevailing longitudinal extension. The pin shank 19 has a pin shank diameter Dg. The elastic element 6 is fitted on said pin body 2 and arranged in said pin annular housing 5, wherein said elastic element 6 can be accommodated in said first housing first portion 31, wherein said elastic element 6 is adapted to abut against said first housing abutment portion 32, wherein said elastic element 6 comprises an elastic element outer diameter De. The pin shank diameter Dg measured in any cross-section relative to said pin axis X-X of said pin shank 19 along its longitudinal extension is either smaller than or equal to said caliper body second housing diameter Ds measured in any cross-section relative to said housing axis G-G of said caliper body second housing 30 along its longitudinal extension and to said caliper body first housing diameter Dp measured in any cross-section relative to said housing axis G-G of said first housing third portion 38. Said elastic element outer diameter De measured in at least a cross-section relative to said pin axis X-X of said elastic element 6 is greater than said shank diameter Dg measured in any cross-section relative to said pin axis X-X of the pin shank 19 along its longitudinal extension.

According to an embodiment, said pad supporting pin 1 is part of said caliper body, supporting pin and elastic element assembly 100 as described above.

The present invention further relates to a caliper body 28 of a brake caliper 27 adapted to cooperate with a pin assembly as described hereinabove.

The caliper body 28 comprises a first elongated element 44 and a second elongated element 45, wherein said first elongated element 44 comprises at least a caliper body first housing 29 and said second elongated element 45 comprises at least a caliper body second housing 30, wherein said caliper body first housing 29 and said caliper body second housing 30 each have axis G-G, wherein said caliper body first housing 29 comprises in succession at least a first housing first portion 31, a first housing abutment portion 32 and a first housing third portion 38, said caliper body first housing 29 having a prevailing longitudinal extension and having a caliper body first housing diameter Dp, and said caliper body second housing 30 having a prevailing longitudinal extension and having a caliper body second housing diameter Ds, wherein said caliper body second housing diameter Ds measured in any cross-section relative to said housing axis G-G of said caliper body second housing 30 along its longitudinal extension is either greater than or equal to said pin shank diameter Dg measured in any cross-section relative to said pin axis X-X of said pin shank 19 along its longitudinal extension, wherein said caliper body first housing diameter Dp measured in any cross-section relative to said housing axis G-G of said first housing third portion 38 is either greater than or equal to said pin shank diameter Dg measured in any cross-section relative to said pin axis X-X of said pin shank 19 along its longitudinal extension, wherein said first housing diameter Dp measured in at least at one cross-section relative to said housing axis G-G of said first housing first portion 31 is equal to said elastic element outer diameter De measured in at least a cross-section relative to said pin axis X-X of said elastic element 6, and wherein said first housing diameter Dp measured in at least a cross-section relative to said housing axis G-G of said first housing abutment portion 32 is smaller than said elastic element outer diameter De measured in at least a cross-section relative to said pin axis X-X of said elastic element 6 so that said first housing abutment portion 32 axially abuts said elastic element 6 by defining a limit stop abutment of said supporting pin 1 in said caliper body 28.

According to an embodiment, said caliper body 28 is part of said caliper body, supporting pin and elastic element assembly 100 as described above.

The present invention further relates to an assembling method for a pad supporting pin 1 into a caliper body 28 of a vehicle.

Said method provides the following steps:

providing a pad supporting pin comprising a pin body 2 extending along a pin axis X-X between a proximal pin end 3 and a distal pin end 4 and comprising in succession at least a pin annular housing 5 and pin shank 19 in succession, providing an elastic element 6 and fitting it on said pin body 2 at said annular housing 5 providing a caliper body 28 of a brake caliper 27, wherein said caliper body 28 comprises a first elongated element 44 and a second elongated element 45, wherein said first elongated element 44 comprises at least a caliper body first housing 29 and said second elongated element 45 comprises at least a caliper body second housing 30, wherein said first caliper body first housing 29 and said caliper body second housing 30 each have a housing axis G-G parallel to and coincident with said pin axis X-X, wherein said caliper body first housing 29 comprises in succession at least a first housing first portion 31, a first housing abutment portion 32, and a first housing third portion 38, inserting said pin 1 in said caliper body 28 for a first insertion stretch, wherein in said first insertion stretch said pin distal end 4 slides through the caliper body first housing 29 in the direction of said caliper body second housing 30 until it enters into said caliper body second housing 30, and wherein at the end of said first insertion stretch said pin annular housing 5 and said elastic element 6 are positioned at a mouth of said caliper body first housing 29, inserting said pin 1 into said caliper body 28 for a second insertion stretch by applying a force to said pin proximal end 3 in the direction of said pin distal end 4, wherein in said second insertion stretch said pin distal end 4 slides inside said caliper body second housing 30 and said elastic element 6 slides inside said first housing first portion 31 until said elastic element 6 axially abuts said first housing abutment portion 32 defining a limit stop abutment of said pin 2 inside said caliper body 28, preventing the pin body 2 from axially abutting the caliper body surfaces 28 which extend in a radial direction R-R.

According to an embodiment, said pad supporting pin 1 and said caliper body 28 are part of said caliper body, supporting pin and elastic element assembly 100 as described above. According to an embodiment, said method comprises providing a caliper body, pin and elastic element assembly 100 as described above.

The suggested solutions, by virtue of a pin body free from portions configured to work a caliper body, and by virtue of the provision of an elastic element 6 having dimensions such as to form both a radial seal and an axial abutment with a caliper body, make it possible to obtain a pin 1 in which, unlike that known in the prior art, the elastic element 6 has the dual function of forming a radial seal with the caliper body and of axially abutting against the caliper body, respectively limiting the movements of the pin in the extraction direction from the caliper body 28 and defining the maximum axial insertion position, or axial abutment position, of said pin 1 in the caliper body 28 without the pin body 2 abutting against the caliper body 28.

The suggested solutions, by virtue of the provision of the elastic element 6 configured to form a radial seal with the caliper body and configured to abut axially against the caliper body, makes it possible to avoid providing complex machining to form portions of the axial abutment pin with the caliper body and thus limit the turning operations of the raw drawn supporting pin 1 substantially to make the annular housing 5.

By virtue of the suggested solutions, it is possible to produce extremely simple pad supporting pins 1 in which said pins 1 have substantially constant diameter pin bodies 2, minus the portion of the pin in which the annular housing for the elastic element is made, and free from further abutments.

Furthermore, the provision of a cylindrical-tubular-shaped elastic element 6 is very advantageous compared to the use of a known barrel-shaped elastic element, because it can be obtained from commercially available standard cylindrical-shaped drawn material further lowering the production costs of the pin 1.

By virtue of the suggested solutions, it is possible to make assemblies 100 in a simplified manner, limiting the turning operations of the pin body to a maximum of 25% of the surface of the supporting pins 1. Conversely, the supporting pins of the known type have turning operations concerning more than 80% of the outer surface.

By virtue of the suggested solutions, it is possible to make caliper bodies 28 of brake calipers 27 of both the monobloc and two-piece type by unifying the caliper body housings which accommodate the pin 1 for both types of brake calipers. In this manner, the same pin 1 can be used for both of these types of brake calipers, further simplifying the organization of assembly line operations.

LIST OF REFERENCES

100 caliper body, pin and elastic element assembly
1 brake pad supporting pin
2 supporting pin body
3 pin proximal end
4 distal pin end
5 pin annular housing
6 elastic element
7 pin first shoulder
8 shank tapered portion
9 reduced diameter pin portion
10 first shoulder radially inner edge
11 first shoulder radially outer edge
12 elastic element first wall
13 elastic element second wall
14 elastic element radially outer axial wall
15 elastic element third wall
16 pin second shoulder
17 pin head
18 pin central portion
19 pin shank
20 elastic element through opening
21 elastic element radially inner axial wall
22 caliper spring pin central portion cut-away
23*a* brake pad
23*b* brake pad
24 backing plate
25 friction material
26 plate through hole
27 brake caliper
28 caliper body
29 caliper body first housing
30 caliper body second housing
31 first housing first portion
32 first housing abutment portion
33 second housing wall or first housing second portion
34 first housing first wall
35 first housing second wall
36 first housing second wall radially outer edge
37 first housing second wall radially inner edge
38 first housing third portion
39 first housing third wall
40 first housing fourth portion
41 first housing fourth wall
42 first housing fourth wall first edge
43 first housing fourth wall second edge
44 caliper body elongated first element
45 caliper body elongated second element
46 pin abutment portions
Dt pin head diameter
Da pin annular housing diameter
Dg pin shank diameter
Dd pin distal end diameter
Dp first housing diameter
Ds second housing diameter
Dp1 first housing first portion diameter
Dp3 first housing third portion diameter
Dp4 first housing fourth portion diameter
De elastic element outer diameter
Di elastic element inner diameter
R1 first connection radius
R2 second connection radius
X-X pin axis
A-A axial direction
R-R radial direction
G-G caliper body housing axis

The invention claimed is:

1. A caliper body, pin and elastic element assembly, comprising:

a caliper body comprising a first elongated element and a second elongated element, wherein said first elongated element comprises at least a caliper body first housing and said second elongated element comprises at least a caliper body second housing, wherein said caliper body first housing and said caliper body second housing each have a housing axis, wherein said caliper body first housing comprises at least a first housing first portion, a first housing abutment portion and a first housing third portion, said caliper body first housing having a caliper body first housing diameter, and said caliper body second housing having a caliper body second housing diameter;

a brake pad supporting pin comprising a pin body that extends along a pin axis between a pin proximal end and a pin distal end, wherein said pin body is adapted to be inserted into said caliper body first housing and said caliper body second housing, wherein said pin body comprises at least a pin annular housing for an elastic element and a pin shank having a prevailing longitudinal extension, wherein said pin shank has a pin shank diameter, wherein said caliper body, pin and elastic element assembly comprises the elastic element, wherein said elastic element is fitted on said pin body in said pin annular housing, wherein said elastic element, when said brake pad supporting pin is fitted in said caliper body first and second housings, is accommodated in said first housing first portion and abuts said first housing abutment portion, wherein said elastic element comprises an elastic element outer diameter, wherein said pin shank diameter measured in any cross-section with respect to said pin axis of said pin shank along its longitudinal extension is either smaller than or equal to said caliper body second housing diameter measured in any cross-section with respect to said housing axis of said caliper body second housing and of said caliper body first housing diameter measured in any cross-section with respect to said housing axis of said first housing third portion, wherein said elastic element outer diameter measured in at least a cross-section with respect to said elastic element is greater than said shank diameter measured in any cross-section with respect to said pin axis of said pin shank along its longitudinal extension, wherein said elastic element outer diameter measured in at least a cross-section of said elastic element is either greater than or equal to said caliper body first housing diameter measured in at least a cross-section with respect to said housing axis of said first housing first portion, and wherein said elastic element outer diameter measured in at least a cross-section of said elastic element is greater than a diameter of said first housing abutment portion wherein, when said brake pad supporting pin is fitted in said caliper body first and second housings, said elastic element axially abuts said first housing abutment portion defining a limit stop abutment of said brake pad supporting pin in said caliper body, wherein the elastic element defines the sole axial limit stop for the pin against the caliper body.

2. The caliper body, pin and elastic element assembly of claim 1, wherein said pin annular housing has a pin annular housing diameter, said pin annular housing diameter measured in any cross-section with respect to said pin axis of said pin annular housing along its longitudinal extension is either smaller than or equal to said caliper body first housing diameter measured in any cross-section with respect to said housing axis of said caliper body first housing along its longitudinal extension, and wherein the caliper body, pin and elastic element assembly comprises at least one of the following features:

said elastic element has an elastic element inner diameter, wherein said elastic element inner diameter measured in any cross-section with respect to said pin axis of said elastic element along its longitudinal extension is either greater than or equal to said pin annular housing diameter measured in any cross-section with respect to said pin axis of said pin annular housing along its longitudinal extension, and wherein said elastic element inner diameter measured in any cross-section with respect to said pin axis of said elastic element along its longitudinal extension is smaller than said pin shank diameter measured in at least a cross-section with respect to said pin axis of said pin shank along its longitudinal extension;

said pin body comprises a pin head, wherein said pin head has a pin head diameter, wherein said elastic element inner diameter measured in any cross-section with respect to said pin axis of said elastic element along its longitudinal extension is smaller than said pin head diameter measured at any cross-section with respect to said pin axis of said pin head along its longitudinal extension, and wherein said pin head diameter is smaller than said caliper body first housing diameter measured at each cross-section with respect to said housing axis of said first housing first portion and said first housing abutment portion along their longitudinal extensions;

said elastic element has dimensions such as to achieve a radial sealing with said first housing first portion to apply a friction force which opposes a force to remove the brake pad supporting pin from the caliper body, wherein said elastic element comprises an elastic element radially outer axial wall adapted to achieve said radial sealing with said first housing first portion;

said pin shank comprises at least a pin first shoulder that axially delimits said pin annular housing in direction of said pin distal end, wherein said pin first shoulder extends in a radial direction between a first shoulder radially inner edge and a first shoulder radially outer edge, wherein said elastic element comprises at least an elastic element first wall and an elastic element second wall, wherein said elastic element first wall is adapted to abut said first pin shoulder, and wherein said elastic element second wall is adapted to axially abut said first housing abutment portion;

when said brake pad supporting pin is inserted in said caliper body first and second housings, said brake pad supporting pin axially abuts said caliper body exclusively by said elastic element.

3. The caliper body, pin and elastic element assembly of claim 2, wherein said elastic element second wall is radially outer relative to said first shoulder radially outer edge both when said brake pad supporting pin is inserted in the caliper body first and second housings and when said brake pad supporting pin is outside the caliper body.

4. The caliper body, pin and elastic element assembly of claim 2, wherein said elastic element first wall is radially inner relative to said first shoulder radially outer edge both when said brake pad supporting pin is inserted in the caliper body first and second housings and when said brake pad supporting pin is outside the caliper body.

5. The caliper body, pin and elastic element assembly of claim 2, wherein the elastic element comprises an elastic element body elastically deformable at least in the radial direction between a resting configuration and a compression configuration, wherein in said resting configuration, said elastic element outer diameter measured in at least a cross-section with respect to said pin axis of said elastic element along its longitudinal extension is greater than said caliper body first housing diameter measured in at least a cross-section with respect to said housing axis of said first housing first portion along its longitudinal extension, and wherein in said compression configuration, said elastic element outer diameter measured in at least a cross-section with respect to said pin axis of said elastic element along its longitudinal extension is equal to said caliper body first housing diameter measured in at least a cross-section with respect to said housing axis of said first housing first portion along its longitudinal extension.

6. The caliper body, pin and elastic element assembly of claim 2, wherein said elastic element comprises an elastic element through-opening, wherein said elastic element through-opening extends in the radial direction, between said elastic element radially outer axial wall and an elastic element radially inner axial wall, and in an axial direction, between said elastic element first wall and said elastic element second wall, and an elastic element third wall.

7. The caliper body, pin and elastic element assembly of claim 2, wherein said elastic element second wall extends seamlessly at least in the radial direction from said elastic element first wall, and wherein the caliper body, pin and elastic element assembly comprises at least one of the following features:

said elastic element second wall is connected to said elastic element radially outer axial wall with a first connection radius;

said elastic element first wall is substantially a circular crown that extends in the radial direction facing said first pin shoulder;

said elastic element second wall is substantially a circular crown;

said elastic element radially outer axial wall is a cylindrical wall;

said elastic element has a cylindrical conformation.

8. The caliper body, pin and elastic element assembly of claim 1, wherein said caliper body first housing and said caliper body second housing are through-holes, and wherein the caliper body, pin and elastic element assembly comprises at least one of the following features:

said caliper body comprises a second housing wall defining said caliper body second housing, wherein said second housing wall is cylindrical, and wherein said caliper body second housing diameter is constant;

said caliper body comprises a first housing first wall defining said first housing first portion, wherein said first housing first wall is a cylindrical wall and has a first housing first portion diameter;

said caliper body comprises a first housing second wall defining said first housing abutment portion, wherein said first housing second wall extends at least in a radial direction between a first housing second wall radially outer edge and a first housing second wall radially inner edge;

said caliper body first housing comprises a first housing third portion, wherein said caliper body comprises a first housing third wall defining said first housing third portion, and wherein said first housing third wall is cylindrical and has a first housing third portion diameter;

said caliper body first housing comprises a first housing fourth portion, wherein said caliper body comprises a first housing fourth wall defining said first housing fourth portion, and wherein said first housing fourth wall extends at least in an axial direction between a first housing fourth wall first edge and a first housing fourth wall second edge that defines an insertion mouth to insert said brake pad supporting pin in said caliper body.

9. The caliper body, pin and elastic element assembly of claim 8, wherein said first housing third portion diameter is equal to said caliper body second housing diameter.

10. The caliper body, pin and elastic element assembly of claim 8, wherein said first housing second wall radially inner edge has a diameter equal to said first housing third portion diameter.

11. The caliper body, pin and elastic element assembly of claim 8, wherein said first housing second wall is connected to said first housing first wall with a second connection radius.

12. The caliper body, pin and elastic element assembly of claim 8, wherein said first housing second wall radially outer edge has a diameter equal to said first housing first portion diameter, and wherein said first housing second wall radially inner edge has a diameter smaller than said first housing first portion diameter.

13. The caliper body, pin and elastic element assembly of claim 8, wherein said first housing second wall is a circular crown defining a first housing shoulder or is a tapered crown defining an inner chamfer of first housing.

14. The caliper body, pin and elastic element assembly of claim 8, wherein said first housing fourth wall first edge has a diameter equal to said first housing first portion diameter, and wherein said first housing fourth wall radially inner edge has a diameter greater than said first housing first portion diameter; and wherein said first housing fourth wall also extends in the radial direction and is a conical crown defining a first housing outer chamfer that facilitates an insertion of said brake pad supporting pin in said caliper body first housing, or said first housing fourth wall is cylindrical and has a first housing fourth portion diameter greater than said first housing first portion diameter.

15. A brake caliper comprising an assembly according to claim 1 and at least a brake pad supported by a brake pad supporting pin.

16. A pin assembly comprising a brake pad supporting pin and an elastic element adapted to cooperate with a caliper body comprising a first elongated element and a second elongated element, wherein said first elongated element comprises at least a caliper body first housing and said second elongated element comprises at least a caliper body second housing, wherein said caliper body first housing and said caliper body second housing each have a housing axis, wherein said caliper body first housing comprises in succession at least a first housing first portion, a first housing abutment portion and a first housing third portion, said caliper body first housing having a longitudinal extension and having a caliper body first housing diameter, and said caliper body second housing having a longitudinal extension and having a caliper body second housing diameter, wherein said brake pad supporting pin comprises a pin body that extends along a pin axis between a pin proximal end and a pin distal end, wherein said pin axis defines an axial direction, either coincident with or parallel to said pin axis, and a radial direction transverse to said axial direction, wherein said pin body is adapted to fit into said caliper body first housing and said caliper body second housing, wherein said pin axis is parallel and coincident with each housing axis, wherein said pin body comprises in succession at least a pin annular housing for the elastic element and a pin shank of a prevailing longitudinal extension, wherein said pin shank has a pin shank diameter, wherein said elastic element is fitted on said pin body and arranged in said pin annular housing, wherein said elastic element can be accommodated in said first housing first portion, wherein said elastic element is adapted to abut said first housing abutment portion, wherein said elastic element has an elastic element outer diameter, wherein said pin shank diameter measured at a largest cross-section thereof is either smaller than or equal to said caliper body second housing diameter measured in any cross-section with respect to said housing axis of said caliper body second housing along its longitudinal extension and to said caliper body first housing diameter measured in any cross-section with respect to said housing axis of said first housing third portion, and wherein said elastic element outer diameter measured in at least a cross-section with respect to said pin axis of said elastic element is greater than said pin shank diameter measured in any cross-section with respect to said pin axis of said pin shank along its longitudinal extension.

17. A caliper body of a brake caliper adapted to cooperate with the pin assembly according to claim 16, wherein said caliper body comprises a first elongated element and a second elongated element, wherein said first elongated element comprises at least a caliper body first housing and said second elongated element comprises at least a caliper body second housing, wherein said caliper body first housing and said caliper body second housing each have a housing axis, wherein said caliper body first housing comprises in succession at least a first housing first portion, a first housing abutment portion and a first housing third portion, said caliper body first housing having a longitudinal extension and having a caliper body first housing diameter, and said caliper body second housing having a longitudinal extension and having a caliper body second housing diameter, wherein said caliper body second housing diameter measured in any cross-section with respect to said housing axis of said caliper body second housing along its longitudinal extension is either greater than or equal to said pin shank diameter measured in any cross-section with respect to said pin axis of said pin shank along its longitudinal extension, wherein said caliper body first housing diameter measured in any cross-section with respect to said housing axis of said first housing third portion is either greater than or equal to said pin shank diameter measured in any cross-section with respect to said pin axis of said pin shank along its longitudinal extension, wherein said caliper body first housing diameter measured in at least a cross-section with respect to said housing axis of said first housing first portion is equal to said elastic element outer diameter measured in at least a cross-section with respect to said pin axis of said elastic element, and wherein said first caliper body housing diameter measured in at least a cross-section with respect to said housing axis of said first housing abutment portion is smaller than said elastic element outer diameter measured in at least a cross-section with respect to said pin axis of said elastic element so that said first housing abutment portion axially abuts said elastic element by defining a limit stop abutment of said brake pad supporting pin in said caliper body.

18. An assembly method of a brake pad supporting pin in a caliper body of a vehicle, the assembly method comprising:

providing a brake pad supporting pin comprising a pin body extending along a pin axis between a pin proximal end and a pin distal end and comprising a pin annular housing and a pin shank in succession, providing an elastic element and fitting the elastic element on said pin body at said pin annular housing, providing a caliper body of a brake caliper, wherein said caliper body comprises a first elongated element and a second elongated element, wherein said first elongated element comprises at least a caliper body first housing and said second elongated element comprises at least a caliper body second housing, wherein said caliper body first housing and said caliper body second housing each have a housing axis parallel and coincident with said pin axis, wherein said caliper body first housing comprises in succession at least a first housing first portion, a first housing abutment portion and a first housing third portion, wherein the elastic element defines the sole axial limit stop for the pin against the caliper body inserting said brake pad supporting pin in said caliper body for a first insertion stretch, wherein in said first insertion stretch said pin distal end slides through the caliper body first housing in direction of said caliper body second housing until the pin distal end enters into said caliper body second housing, and wherein at the end of said first insertion stretch said pin annular housing and said elastic element are positioned at a mouth of said caliper body first housing, and inserting said brake pad supporting pin into said caliper body for a second insertion stretch by applying a force to said pin proximal end in direction of said pin distal end, wherein in said second insertion stretch said pin distal end slides inside said caliper body second housing and said elastic element slides inside said first housing first portion until said elastic element axially abuts said first housing abutment portion defining a limit stop abutment of said brake pad supporting pin inside said caliper body, preventing the pin body from axially abutting pin body surfaces developing in a radial direction.

* * * * *